US008573907B2

(12) United States Patent
Kalomeris et al.

(10) Patent No.: US 8,573,907 B2
(45) Date of Patent: Nov. 5, 2013

(54) HOLE CUTTER WITH MINIMUM TOOTH PITCH TO BLADE BODY THICKNESS RATIO

(75) Inventors: Charles E. Kalomeris, East Longmeadow, MA (US); Joseph Thomas Novak, East Longmeadow, MA (US); William B. Korb, Broad Brook, CT (US); Christopher F. Fitzgerald, Belchertown, MA (US)

(73) Assignee: Irwin Industrial Tool Company, Huntersville, NC (US)

( * ) Notice: Subject to any disclaimer, the term of this patent is extended or adjusted under 35 U.S.C. 154(b) by 968 days.

(21) Appl. No.: 12/687,073

(22) Filed: Jan. 13, 2010

(65) Prior Publication Data

US 2011/0170970 A1    Jul. 14, 2011

(51) Int. Cl.
*B23B 51/05*    (2006.01)
*B23B 51/04*    (2006.01)

(52) U.S. Cl.
USPC ............................ 408/204; 408/206; 408/703

(58) Field of Classification Search
USPC .......................................... 408/204, 206, 703
See application file for complete search history.

(56) References Cited

U.S. PATENT DOCUMENTS

| 1,150,279 | A |   | 8/1915  | Little   |         |
|-----------|---|---|---------|----------|---------|
| 1,234,468 | A |   | 7/1917  | Hamilton |         |
| 1,448,697 | A | * | 3/1923  | Misener  | 408/206 |
| 1,494,897 | A |   | 3/1923  | Freye    |         |
| 2,179,029 | A |   | 11/1938 | Barnes   |         |
| 2,312,176 | A |   | 1/1941  | Kotowski |         |
| 2,319,528 | A |   | 7/1942  | Berbour et al. | |
| 2,427,085 | A |   | 5/1946  | Allison  |         |
| 2,482,439 | A |   | 5/1946  | Smith    |         |
| 2,473,077 | A |   | 7/1946  | Starbuck, Jr. | |
| 2,633,040 | A |   | 1/1952  | Schlage  |         |
| 2,794,469 | A |   | 1/1954  | Shortell |         |
| 2,779,361 | A |   | 3/1954  | McKiff   |         |
| 2,852,967 | A |   | 2/1956  | Mueller et al. | |
| 3,220,449 | A |   | 11/1965 | Franklin |         |
| 3,387,637 | A |   | 6/1968  | Ferguson et al. | |
| 3,609,056 | A | * | 9/1971  | Hougen   | 408/204 |
| 3,610,768 | A |   | 10/1971 | Cochran  |         |
| 3,810,514 | A |   | 5/1974  | Viscovich |        |
| 3,880,546 | A |   | 4/1975  | Segal    |         |
| 3,973,862 | A |   | 8/1976  | Segal    |         |
| 4,077,737 | A |   | 3/1978  | Morse    |         |
| D282,369  | S |   | 1/1986  | de Villiers |      |
| 4,652,185 | A |   | 3/1987  | Malrick  |         |

(Continued)

OTHER PUBLICATIONS

International Search Report for International Application No. PCT/US2011/021216 mailed Mar. 9, 2011.

(Continued)

*Primary Examiner* — David Bryant
*Assistant Examiner* — Jason L Vaughan
(74) *Attorney, Agent, or Firm* — McCarter & English, LLP

(57) ABSTRACT

A hole cutter for cutting a work piece, such as a wood and/or metal work piece, has a substantially cylindrical blade body defining a wall thickness within the range of about 0.032 inch to about 0.038 inch, and a cutting edge formed on one end of the blade body including a plurality of teeth defining an average tooth pitch within the range of about 3.5 TPI to about 5.5 TPI for cutting the work piece and forming chips therefrom. The substantially cylindrical blade body and cutting edge define an average tooth pitch to blade body thickness ratio of at least about 110.

23 Claims, 2 Drawing Sheets

(56) References Cited

U.S. PATENT DOCUMENTS

| | | |
|---|---|---|
| D303,118 S | 8/1989 | Cox |
| 5,007,777 A | 4/1991 | Itokazu |
| D317,455 S | 6/1991 | Martin |
| 5,044,393 A | 9/1991 | Jiles |
| 5,049,010 A | 9/1991 | Oakes |
| 5,058,620 A | 10/1991 | Jiles |
| 5,082,403 A | 1/1992 | Sutton et al. |
| 5,171,111 A | 12/1992 | Kishimoto |
| 5,205,675 A | 4/1993 | Hamel |
| 5,205,685 A * | 4/1993 | Herbert .................. 408/204 |
| D342,270 S | 12/1993 | Kwang |
| 5,597,274 A | 1/1997 | Behner |
| 5,651,646 A | 7/1997 | Banke et al. |
| D392,297 S | 3/1998 | Brutscher |
| 5,803,677 A | 9/1998 | Brutscher et al. |
| 5,803,678 A | 9/1998 | Korb et al. |
| 5,820,315 A | 10/1998 | Collard |
| D408,831 S | 4/1999 | McGregor |
| 5,904,454 A | 5/1999 | Washer |
| 6,007,279 A | 12/1999 | Malone |
| 6,152,661 A | 11/2000 | Thrasher |
| D438,219 S | 2/2001 | Brutscher |
| 6,341,925 B1 | 1/2002 | Despres |
| 6,357,973 B2 | 3/2002 | Chao |
| 6,409,436 B1 | 6/2002 | Despres |
| 6,588,992 B2 | 7/2003 | Rudolph |
| 6,599,063 B1 | 7/2003 | Casstran |
| D478,339 S | 8/2003 | Morton et al. |
| D478,919 S | 8/2003 | Morton et al. |
| 6,623,220 B2 | 9/2003 | Nuss et al. |
| 6,641,338 B2 | 11/2003 | Despres |
| 6,676,343 B2 | 1/2004 | Burk |
| 6,746,187 B2 | 6/2004 | Alm |
| 6,786,684 B1 | 9/2004 | Ecker |
| 6,893,194 B2 | 5/2005 | Jones et al. |
| 6,948,574 B2 | 9/2005 | Cramer et al. |
| D516,594 S | 3/2006 | Morton |
| 7,097,397 B2 | 8/2006 | Keightley |
| 7,101,124 B2 | 9/2006 | Keightley |
| 7,160,064 B2 | 1/2007 | Jasso |
| 7,163,362 B2 | 1/2007 | Keightley |
| 7,189,036 B1 | 3/2007 | Watson |
| D551,269 S | 9/2007 | Burke, III |
| D588,175 S | 3/2009 | Morton |
| 7,556,459 B2 | 7/2009 | Rompel et al. |
| 2004/0042861 A1 | 3/2004 | Capstran |
| 2005/0214086 A1 | 9/2005 | Nicholas |
| 2005/0244238 A1 | 11/2005 | Burk |
| 2006/0130629 A1 | 6/2006 | Rompel et al. |
| 2006/0285934 A1 | 12/2006 | Keightley |
| 2007/0003386 A1 | 1/2007 | Keightley |
| 2007/0036620 A1 | 2/2007 | Keightley |
| 2007/0110527 A1 | 5/2007 | Jasso |
| 2007/0166116 A1 | 7/2007 | Olson et al. |
| 2007/0212179 A1 | 9/2007 | Khangar et al. |
| 2007/0269280 A1 | 11/2007 | Vasudeva et al. |
| 2008/0019785 A1 | 1/2008 | Keightley |
| 2008/0050189 A1 | 2/2008 | Keightley |
| 2008/0181738 A1 | 7/2008 | Capriotti et al. |
| 2008/0187405 A1 | 8/2008 | Nordlin |
| 2008/0260480 A1 | 10/2008 | Keightley |
| 2009/0035082 A1 | 2/2009 | Singh |
| 2009/0044674 A1 | 2/2009 | Neitzell |
| 2009/0169317 A1 | 7/2009 | Rae |

OTHER PUBLICATIONS

Written Opinion of International Searching Authority for International Application PCT/US2011/021216 mailed Mar. 9, 2011.
*Specifications for Hole Saws, Hole Saw Arbors, and Hole Saw Accessories*, The American Society of Mechanical Engineers, ASME B94.54, Dec. 30, 1999 (Revision of ASME B94.54—1994).
*Recommended Bi-Metal Steel Strip Specification*, Hack and Band Saw Manufacturers Association of America, Issued Apr. 18, 1996.
*Recommended Hole Saw Strip Specification*, Hack and Band Saw Manufacturers Association of America, Bulletin No. HB-710, Mar. 6, 1991.
*Hole Saws, Hole Saw Arbors, and Hole Saws With Integral Arbors*, The General Services Administration of the United States, Federal Specification GGG-S-66C, A-A-51135, Oct. 23, 1984.

\* cited by examiner

HOLE CUTTER WITH MINIMUM TOOTH PITCH TO BLADE BODY THICKNESS RATIO

FIELD OF THE INVENTION

The present invention relates to hole cutters, and more particularly, to hole cutters for cutting a variety of work pieces, such as wood and metal, and including features for increasing cutting speed and/or improving blade life.

BACKGROUND INFORMATION

A typical prior art hole cutter includes a cylindrical blade body defining a plurality of saw teeth on the cutting edge of the blade body, and one or more apertures formed through an intermediate portion of the blade body. Typically, smaller diameter hole cutters have fewer apertures formed through the blade bodies, and larger diameter hole cutters have more apertures formed through the blade bodies. The apertures formed through prior art hole cutter blade bodies may define a variety of different configurations to facilitate inserting a tool into the apertures, such as a screw driver, to remove circular work piece slugs from the interiors of the blade bodies.

One of the drawbacks encountered with prior art hole cutters is that chips or dust, particularly when cutting wood, collects within the interiors of the hole cutters between the work piece slugs and the caps on the non-working ends of the hole cutters. The apertures formed in the side walls of the blade bodies are designed to allow the insertion of screw drivers or like tools to remove work piece slugs, but are not configured to allow the chips or dust generated during cutting to flow through the apertures and away from the interiors of the blade bodies. The chips and dust that collect within the interiors of the blade bodies can become compacted and rapidly fill the hole cutters. Chips and dust also collect at the interfaces between the blade bodies and work pieces, such as between the external surfaces of the blade bodies and the work pieces. The chips and dust that collect at the interfaces of the blades bodies and work pieces can become heated due to frictional forces created between the rotating blade bodies, collected chips and dust, and work pieces. The thermal energy created by such frictional forces can be sufficient to cause the paints or coatings on the external surfaces of the blade bodies to become soft or gooey. The collection of chips and dust within the interiors of the blade bodies and/or at the interfaces of the blade bodies and work pieces can significantly reduce the cutting efficiency and overall cutting speed and/or blade life of such hole cutters.

Another drawback encountered with prior art hole cutters is that the blade bodies are relatively thick, typically on the order of at least about 0.05 inch thick. It has heretofore been believed that such wall thicknesses were required in order to provide the hole cutters with sufficient rigidity and strength to withstand the forces encountered during cutting. For example, the United States General Services Administration standard (A-A-51135, October 1984) has taught that hole saws measuring 1⅜ inches in diameter and larger should define a blade body thickness of at least about 0.047 inch. The widths of the cutting teeth are typically about the same as the thicknesses of the blade bodies. As a result, the cutting teeth are relatively wide, thus generating a substantial volume of chips and/or dust during cutting. The rate at which the chips and/or dust are generated during cutting can rapidly overcome any ability of such prior art hole cutters to allow for the egress of chips or dust away from the interiors of the hole cutters and/or the interfaces between the blade bodies and work pieces. As a result, prior art hole cutters can become rapidly filled with chips and/or dust, and/or can rapidly collect chips and/or dust at the interfaces of the blade bodies and work pieces, giving rise to substantial heat during cutting that can soften or otherwise turn the paints or coatings on the hole cutters soft or gooey. The soft or gooey paints or coatings, combined with the collected chips and dust, further degrade the cutting efficiency of the hole cutters and reduce overall cutting speed and/or blade life.

Accordingly, it is an object of the present invention to overcome one or more of the above-described drawbacks and/or disadvantages of the prior art.

SUMMARY OF THE INVENTION

In accordance with a first aspect, the present invention is directed to a hole cutter for cutting a work piece, such as a wood and/or metal work piece. The hole cutter comprises a substantially cylindrical blade body defining a wall thickness within the range of about 0.032 inch to about 0.038 inch, and a cutting edge formed on one end of the blade body including a plurality of teeth defining an average tooth pitch within the range of about 3.5 TPI to about 5.5 TPI for cutting the work piece and forming chips therefrom. The substantially cylindrical blade body and cutting edge define an average tooth pitch to blade body thickness ratio of at least about 110.

The currently preferred embodiments of the present invention define an average tooth pitch within the range of about 4 TPI to about 5 TPI, and an average tooth pitch to blade body thickness ratio of at least about 120. Some such embodiments further define an average tooth pitch to blade body thickness ratio within the range of about 130 to about 140.

The currently preferred embodiments of the present invention further define at least one axially-elongated aperture formed through the blade body. The aperture is axially spaced relative to the cutting edge, extends substantially in an axial direction of the blade body, and is configured to receive chips flowing from the cutting edge within the interior of the blade body and (i) into the aperture, and/or (ii) through the aperture, to prevent the collection of such chips within the interior of the blade body and/or at an interface between the blade body and work piece. In some embodiments, the axially-elongated aperture defines a first end adjacent to the cutting edge and axially spaced therefrom a first distance within the range of about 15/100 inch to about ⅜ inch. Some such embodiments define a plurality of such axially-elongated apertures that are angularly spaced relative to each other.

In some embodiments of the present invention, the hole cutter defines a direction of rotation that is the cutting direction of the cutting edge, and the axially-elongated aperture defines a first end axially spaced adjacent to the cutting edge, and a second end axially spaced further away from the cutting edge than the first end and angularly spaced relative to the first end in a direction opposite to the cutting direction. In some such embodiments, the second end of the axially-elongated aperture is axially spaced from the cutting edge a second distance of at least about 1½ inches. In some embodiments of the present invention, the axially-elongated aperture defines an axially-elongated slot oriented at an acute angle relative to an axis of the blade body. The acute angle is at least about 30°, and preferably is within the range of about 35° to about 60°.

In some embodiments of the present invention, the hole cutter defines a direction of rotation that is the cutting direction of the cutting edge, and the inlet end of the axially-elongated aperture defines an edge surface that slopes away from the cutting edge in a direction opposite the cutting direction. In some such embodiments, the inlet end defines a maximum width of at least about 4/10 inch, the sloped surface is at least about 4/10 inch long, and the sloped surface is curvilinear, rectilinear and/or a combination of curvilinear and rectilinear edge surface regions. In some such embodiments, the sloped surface is oriented at an acute angle relative to an axis of the blade body within the range of about 35° to about 60°. In some such embodiments, the axis of the elongated aperture or slot is substantially parallel to an axis of rotation of the hole cutter.

In accordance with another aspect, the present invention is directed to a hole cutter for cutting a work piece. The hole cutter comprises a substantially cylindrical blade body defining a wall thickness within the range of about 0.032 inch to about 0.038 inch, a cutting edge formed on one end of the blade body, and at least one means formed within the blade body for receiving chips flowing from the cutting edge within the interior of the blade body and at least one of (i) into said means, and (ii) through said means, and for preventing the collection of such chips within at least one of the interior of the blade body and an interface between the blade body and work piece. The cutting edge includes a plurality of teeth defining an average tooth pitch within the range of about 3.5 TPI to about 5.5 TPI for cutting the work piece and forming chips therefrom, and the substantially cylindrical blade body and cutting edge define an average tooth pitch to blade body thickness ratio of at least about 110.

In the currently preferred embodiments of the present invention, the means is defined by an axially-elongated aperture formed through the blade body. The aperture is axially spaced relative to the cutting edge, extends substantially in an axial direction of the blade body, and is configured to receive chips flowing from the cutting edge within the interior of the blade body and at least one of (i) into the aperture, and (ii) through the aperture, for preventing the collection of such chips within at least one of the interior of the blade body and an interface between the blade body and work piece. In some such embodiments, the axially-elongated aperture defines a first end adjacent to the cutting edge and axially spaced therefrom a first distance within the range of about 15/100 inch to about 3/8 inch, and a second end axially spaced further away from the cutting edge than the first end a second distance of at least about 1½ inches.

One advantage of the hole cutters of the present invention is that the substantially cylindrical blade body defines a relatively thin wall thickness within the range of about 0.032 inch to about 0.038 inch, and thus the hole cutters of the present invention can generate a significantly lesser volume of chips than prior art hole cutters of comparable diameters, tooth forms and pitch patterns. Yet another advantage of the hole cutters of the present invention is that they define a relatively high tooth pitch to blade body thickness ratio of at least about 110, preferably at least about 120, and most preferably within the range of about 130 to about 140. This unique combination of a relatively thin blade body, specified tooth pitch range, and relatively high tooth pitch to blade body thickness ratio, allows the hole cutters of the present invention to cut more efficiently, and to unexpectedly achieve significantly faster cutting speeds and blade life in comparison to prior art hole cutters. Further, despite the teaching in the prior art that a thicker wall thickness would be required, the hole cutters of the present invention are not only tough but achieve unexpectedly improved cutting performance.

These and other objects and advantages of the hole cutters of the present invention, and/or of the currently preferred embodiments thereof, will become more readily apparent in view of the following detailed description of the currently preferred embodiments and accompanying drawings.

DETAILED DESCRIPTION OF PREFERRED EMBODIMENTS

Figure 1:
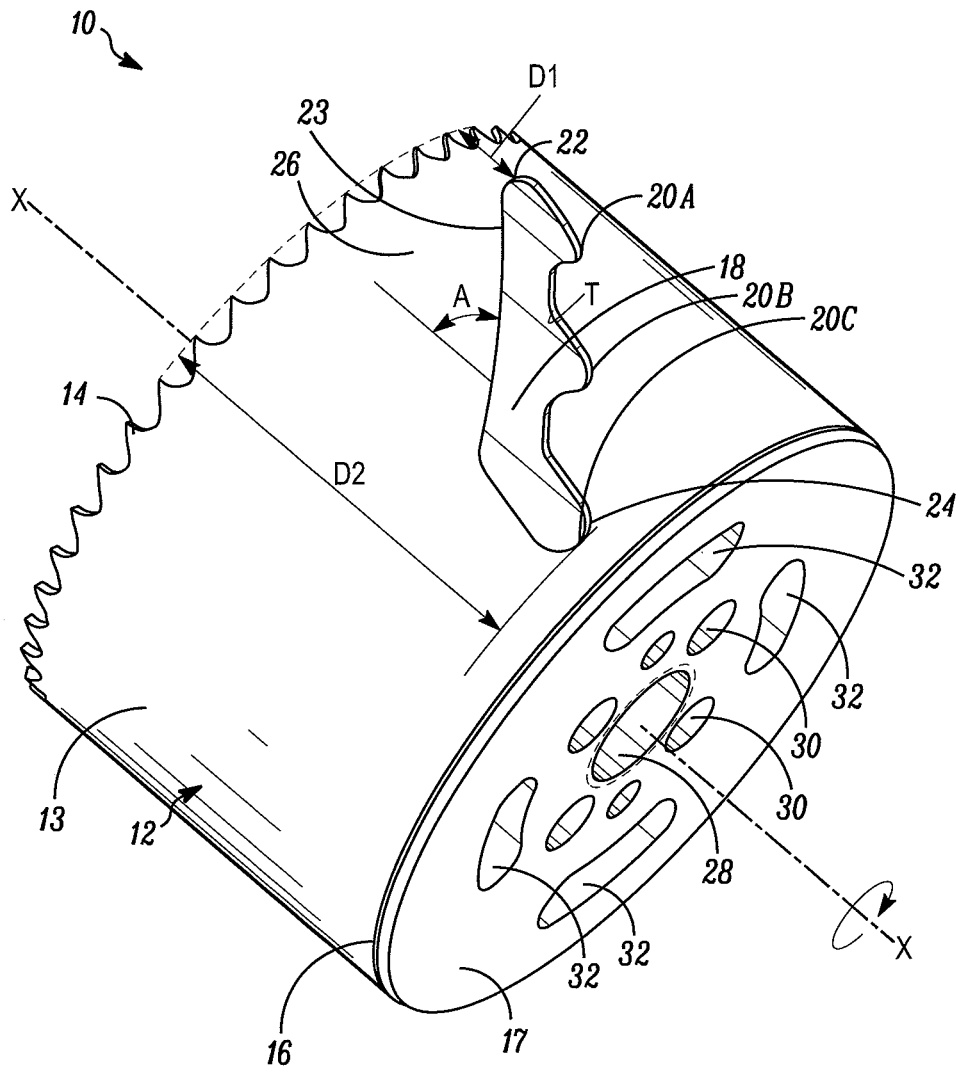
FIG. 1 is a perspective view of a currently preferred embodiment of a hole cutter of the present invention.
Figure 2:
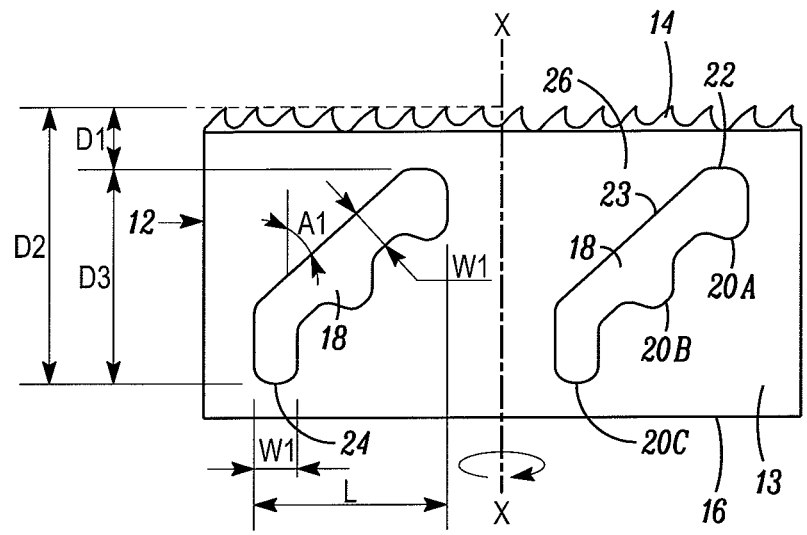
FIG. 2 is a side elevational view of the blade of the hole cutter of FIG. 1 prior to being formed into a cylindrical blade body.

In FIG. 1, a hole cutter embodying the present invention is indicated generally by the reference numeral 10. The term "hole cutter" is used here to mean a tool that cuts holes in work pieces, such as wood or metal work pieces, and includes without limitation hole saws. The hole cutter 10 includes a blade body 12 defining a side wall 13. The blade body 12 is shown in FIG. 2 in its flattened state; however, as shown in FIG. 1, the blade body 12 is rolled or otherwise formed into a substantially cylindrical shape to form the hole cutter 10. As shown in FIG. 1, the side wall 13 extends around an axis of rotation "X" of the hole cutter 10 to define the substantially cylindrical blade body 12. One end of the blade body 12 is provided with a cutting edge 14 oriented substantially perpendicular to the axis of rotation X, and the opposing end of the blade body defines a rim 16. As shown in FIG. 1, a cap 17 is fixedly secured, such as by welding, to the rim 16 to enclose the respective end of the hole cutter 10, which is referred to herein as the "non-working" end of the hole cutter. The cap 17 includes a central hub 28 defining a threaded aperture for threadedly engaging an arbor, a plurality of drive pin apertures 30 substantially equally spaced relative to each other about the central hub 28 for engaging the drive pins of the arbor, and a pair of angularly-extending apertures 32 spaced about 180° apart on opposite sides of the hub 28 relative to each other. The angularly-extending apertures 32 are dimensioned and positioned to allow insertion therein of a tool, such as a screw driver, to facilitate work piece slug removal.

As shown in FIGS. 1 and 2, the cutting edge 14 is defined by a plurality of cutting teeth with gullets extending between the teeth. The cutting teeth are configured to cut into a work piece when the cutter 10 is applied to a work piece and rotated about the axis of rotation X in a cutting direction. In the currently preferred embodiments, the cutting edge 14 is a bi-metal cutting edge wherein the tips of the teeth are formed by a relatively hard metal, such as tool steel, and the other portions of the teeth and blade body are made of relatively softer steel, such as carbon steel. However, as may be recognized by those of ordinary skill in the pertinent art based on the teachings herein, the cutting edge 14 may be defined by any of numerous different tooth forms or other cutting edge forms that are currently known or that later become known. Similarly, although the blade body 12 is shown as being formed from sheet metal that is rolled or otherwise formed into the cylindrical blade body 12 and is, in turn, welded or otherwise attached to the cap 17, the hole cutter 10 may be formed in any of numerous other ways that are currently known, or that later become known. For example, the end cap 17 and side wall 13 may be spun, drawn, molded or otherwise formed in one integral part.

As shown in FIGS. 1 and 2, the blade body 12 defines two axially-elongated apertures or slots 18 formed through the side wall 13. As can be seen, the two slots 18 are angularly spaced relative to each other on the cylindrical blade body 12. In various embodiments of the invention, each slot 18 has an axial depth D3 (D2-D1) ranging from about 1⅛ inches to about 1⅘ inches. In the illustrated embodiment, each slot 18 has an axial depth D3 of about 1⅓ inches. In certain embodiments, each slot 18 has a circumferential length L ranging from about ⅖ inch to about 1⅘ inches. In the illustrated embodiment, the two slots 18 are approximately equally spaced relative to each other, i.e., the two slots 18 are spaced about 180° relative to each other. Each slot 18 is configured to receive therethrough a lever, such as a screw driver, for removal of a work piece slug located within the interior of the blade body 12.

The number of apertures or slots 18 formed through the side wall 13 of the hole cutter depends on the size of the hole cutter. As a general rule, the larger the diameter of the hole cutter, the greater is the number of slots 18 that can be formed through the cylindrical blade body 12. In the embodiment of FIGS. 1 and 2, the diameter of the hole cutter 10 is sufficient to include two axially-extending slots 18 oriented at acute angles relative to the axis X of the hole cutter 10. In the illustrated embodiment, the diameter of the hole cutter 10 is within the range of about 1½ inches to about six inches. Accordingly, each slot 18 is oriented at an acute angle "A" with respect to the axis X of the hole cutter. In the currently preferred embodiments, the angle A is at least about 30°, and is preferably within the range of about 35° to about 60°. In the illustrated embodiment, the acute angle A is about 47°. As may be recognized by those of ordinary skill in the pertinent art based on the teachings herein, these angles are only exemplary, and any of numerous other angles equally may be employed.

In the currently preferred embodiments of hole cutters having multiple slots 18, the slots 18 are approximately equally spaced relative to each other about the axis X of the hole cutter, i.e., if there are two slots 18 they are angularly spaced about 180° relative to each other, if there are three slots 18 they are angularly spaced about 120° relative to each other, if there are four slots 18 they are angularly spaced about 90° relative to each other, etc. However, as may be recognized by those of ordinary skill in the pertinent art based on the teachings herein, the slots 18 need not be equally spaced relative to each other, nor do all apertures or slots 18 on the same hole cutter need to define the same aperture or slot configuration or size.

As shown in FIGS. 1 and 2, each axially-elongated aperture or slot 18 includes three fulcrums 20A, 20B and 20C axially and angularly spaced relative to each other. The fulcrums 20A, 20B and 20C are defined by recessed radiused edge surfaces of the side wall 13 of the blade body 12 that are formed on the edge of the respective slot 18 that is adjacent to, or on the side of, the non-working end of the hole cutter 10. The first fulcrum 20A is located adjacent to the cutting edge 14, the second fulcrum 20C is spaced furthest from the cutting edge 14 and located adjacent to the non-working end of the hole cutter, and is angularly spaced from the first fulcrum 20A in a direction opposite to the cutting direction, and the third fulcrum 20C is located axially and angularly between the first and second fulcrums 20A, 20C.

As shown in FIGS. 1 and 2, each slot 18 defines a first or inlet end 22 that is adjacent to the cutting edge 14, and a second or outlet end 24 that is axially spaced further away from the cutting edge 14 than the first end 22 and is angularly spaced relative to the first end 22 in a direction opposite to the cutting direction. The first end 22 is axially spaced from a plane defined by the cutting edge 14 a first distance D1 within the range of about 15/100 inch to about ⅜ inch. One advantage of this configuration is that the inlet end 22 of each axially-extending slot 18 is spaced closely adjacent to the cutting edge 14 to receive chips flowing from the cutting edge 14 within the interior of the blade body 12 and into the slot 18 and/or through the slot 18, to, in turn, prevent the collection of such chips within the interior of the blade body 12 and/or at an interface between the blade body 12 and work piece. Yet another advantage of this configuration is that the angular orientation of the axially-extending slots 18 facilitates in allowing the chips to flow up through the slots 18 and away from the cutting edge 14 and interior of the blade body 12 as the hole cutter 10 is rotated during a cutting operation. A further advantage of the illustrated blade body 12 is that the inlet end 22 of each slot 18 is axially spaced adjacent to the cutting edge 14 such that a solid or substantially solid annular portion 26 of the blade body 12 extends between the inlet end 22 of each slot 18 and the cutting edge 14. This annular portion 26 of the blade body 12 advantageously provides the blade body 12 with sufficient strength to withstand the heat applied to the blade body 12 during the manufacturing of the hole cutter without distorting the blade body, and provides sufficient strength to the hole cutter 12 to withstand the forces encountered during cutting operations. However, the annular portion 26 of the blade body 12 is sufficiently thin (as indicated above, D1 is within the range of about 15/100 inch to about ⅜ inch) to allow the chips and dust generated at the cutting edge 14 to flow into the slots 18 and away from the interior of the blade body 12. In the currently preferred embodiments, the second end 24 of each slot 18 is axially spaced from the cutting edge a second distance D2 at least about 1 inch, and preferably at least about 1½ inches, and more preferably within the range of about 1½ inches to about 2 inches. In the illustrated embodiment, the distance D2 is about 1¾ inches.

In the illustrated embodiment, the distances D1 and D2 are measured from a plane extending between the tips of unset teeth. However, as may be recognized by those of ordinary skill in the pertinent art based on the teachings herein, these distances, or the distances between other features of the hole cutter 10 and the cutting edge 14, may be measured with respect to any of numerous other reference lines or features that are currently known or used, or that later become known or used, such as from the base of the deepest gullets of the cutting teeth.

As shown in FIG. 2, each axially-extending aperture or slot 18 includes a sloped side edge surface 23 that is angled away from the cutting edge 14 in a direction opposite the cutting direction and spaced opposite the fulcrums 20A, 20B and 20C. In the illustrated embodiment, the sloped side edge 23 of each slot 18 is substantially smooth and rectilinear to facilitate sliding movement of a tool into and through the slot 18 (e.g., from one fulcrum 20A, 20B or 20C to another to progressively remove a slug) and to facilitate chip and/or dust egress through the slot 18. The sloped side edge 23 is spaced from the fulcrums 20A, 20B and 20C such that each slot 18 defines a minimum width W1 of about 0.27 inch to allow insertion and translation of a number 2 screwdriver therethrough.

The hole cutters of the present invention define a relatively large average tooth pitch to blade body thickness ratio. In the currently preferred embodiments of the present invention, the average tooth pitch ("TPI") to blade body thickness ratio is at least about 110, is preferably at least about 120, and is more preferably within the range of about 130 to about 140. The average tooth pitch is the average tooth pitch of each respective tooth pitch pattern. For example, many hole cutters define a variable tooth pitch, and therefore the average tooth pitch is the average of the different tooth pitches in the variable tooth pitch pattern. In other hole cutters defining a constant pitch, the average tooth pitch is the same as the tooth pitch.

The blade body 12 defines a wall thickness T within the range of about 0.032 inch to about 0.038 inch. In the illustrated embodiment, the wall thickness T is about 0.035 inch. Since the blade body 12 and teeth of the cutting edge 14 are made of the same sheet metal, the width of each tooth is approximately the same as the blade body thickness T. As can be seen, the substantially cylindrical blade body 12 and cutting edge 14 define a substantially uniform wall thickness T throughout. The average tooth pitch of the hole cutter 10 is within the range of about 3.5 TPI to about 5.5 TPI, and is preferably within the range of about 4 TPI to about 5 TPI. The tooth spacing may be any distance that falls within the preferred tooth pitch range, i.e., the currently preferred tooth spacing is within the range of about 0.182 to about 0.0286 inch, and preferably is within the range of about 0.1 inch to about 0.3 inch. The average tooth pitch to blade body thickness ratio of the invention is particularly suitable for use in connection with hole cutters defining diameters of about 3½ inches or less.

The term "chip" is used herein to mean small particles of a work piece formed upon cutting the work piece with the hole cutter, and including without limitation, saw dust, wood dust, wood chips, metal dust, metal chips, and dust or chips created upon cutting work pieces formed of materials other than wood or metal, or including materials or components in addition to wood and/or metal. The term "tooth pitch" is used herein to mean the number of cutting teeth per linear inch of the cutting edge, and the term "average tooth pitch" is used herein to mean the average number of teeth per linear inch of the cutting edge. The term "tooth spacing" is used herein to mean the distance between a reference point of adjacent teeth, such as the distance between the tips of adjacent teeth.

The following tables summarize the results of tests performed comparing the hole cutters of the present invention (defining a blade body and cutting edge thickness of 0.035 inch) against prior art hole cutters having thicker blade bodies but otherwise defining the same characteristics as the hole cutters of the invention. As can be seen, the hole cutters of the invention provide unexpectedly improved performance in comparison to comparable prior art hole cutters.

TABLE 1

Hole Cutters with HS35 Cutting Teeth

| Blade body and Cutting Edge Thickness | Number of Cuts Before Failure |
|---|---|
| 0.050 | 132 |
| 0.042 | 201 |
| 0.035 | 341 |

TABLE 2

Hole Cutters with HS26 Cutting Teeth

| Hole Cutter # | Blade body and Cutting Edge Thickness | Number of Cuts Before Failure |
|---|---|---|
| 1 | 0.035 | 231 |
| 2 | 0.050 | 98 |
| 3 | 0.035 | 221 |
| 4 | 0.050 | 120 |

As shown in Table 1, the hole cutter of the invention achieved 140 more cuts before failure (e.g., major tooth breakage or wear) as compared to a hole cutter that included a blade body and cutting edge thickness of 0.042 inch, and achieved 209 more cuts before failure as compared to a hole cutter that included a blade body and cutting edge thickness of 0.050 inch.

Similarly, as shown in Table 2, hole cutter #1 and hole cutter number #3 embodied the present invention and achieved 133 and 123 more cuts, respectively, before failure (e.g., major tooth breakage or wear) as compared to hole cutter #2 which included a blade body and cutting edge thickness of 0.050 inch, and achieved 111 and 101 more cuts, respectively, before failure as compared to hole cutter #3 which also included a blade body and cutting edge thickness of 0.050 inch.

Figure 3:
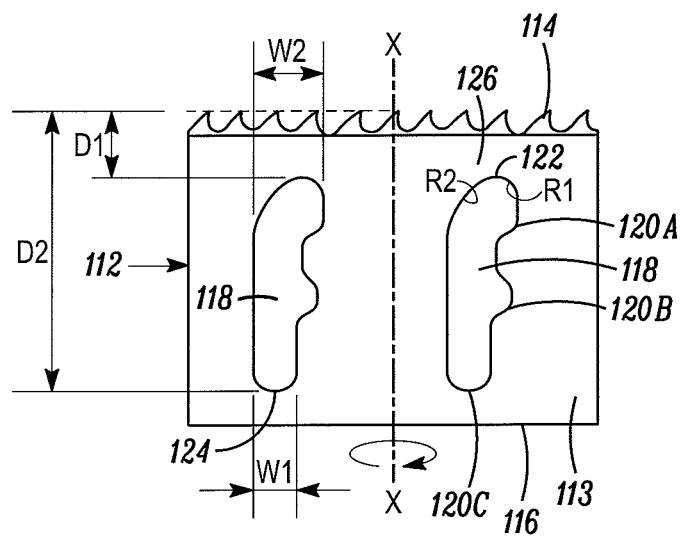
FIG. 3 is a side elevational view of another embodiment of a hole cutter blade of the present invention used for smaller diameter hole cutters and prior to being formed into a cylindrical blade body.

In FIG. 3, another embodiment of a blade body of the present invention is indicated generally by the reference numeral 112. The blade body 112 is shown in its flattened state; however, as shown in FIG. 1 and will be recognized by those of ordinary skill in the pertinent art based on the teachings herein, the blade body 112 is rolled or otherwise formed into a substantially cylindrical shape to form a hole cutter. The blade body 112 is substantially the same as the blade body 12 described above in connection with FIGS. 1 and 2, and therefore like reference numerals preceded by the numeral "1" are used to indicate like elements. The primary difference of the blade body 112 in comparison to the blade body 12 described above is that the axially-extending slots or apertures 118 are oriented substantially parallel to the axis of rotation X of the hole cutter 110. The blade body 112 forms a relatively small diameter hole cutter 100, and therefore the slots 118 cannot define as large a slot area as the larger diameter hole cutters described above, and/or cannot be oriented at acute angles relative to the axis of rotation X of the hole cutter 100. In the illustrated embodiment, the blade body 112 is used to form hole cutters defining blade body diameters within the range of about ⅞ inch to about 1 7/16 inches. The currently preferred embodiments of smaller diameter hole cutters (e.g., about 13/16 inches diameter or less) define the same slot configuration as illustrated in FIG. 3, but include only one such slot 118.

Another difference of the hole cutter 100 in comparison to the hole cutter 10 described above is the configuration of the sloped edge surface of the first or inlet end 122 of each slot 118. As can be seen, the inlet end 122 of each slot 118 is defined by two curvilinear regions. A first curvilinear region is contiguous to a side edge of the first fulcrum 220A and is defined by one or more relatively small radii R1. A second curvilinear region is contiguous to the first curvilinear region and is defined by one or more larger radii R2. As can be seen, the larger radius R2 imparts a shape to the respective edge of the slot 118 that slopes away from the cutting edge 114 in a direction opposite the cutting direction of the blade 112. In addition, the location and orientation of the first fulcrum 120A, the respective side and the sloped edge surface imparts a relatively wide inlet 122 to the slot 118 to facilitate the flow of chips or dust from the cutting edge 114 into the slot 118. In the illustrated embodiment, the width W2 at the inlet 122 of the slot 118 is within the range of about ⅕ to about ⅗ inch, and in the illustrated embodiment is about ⅖ inch.

The hole cutters of the present invention may include one or more features of the hole cutters disclosed and/or claimed in any of the following co-pending patent applications that are assigned to the assignee of the present invention and are hereby expressly incorporated by reference in their entireties as part of the present disclosure: the U.S. patent application filed on even date herewith, Ser. No. 12/687,065, and entitled "Hole Cutter with Axially-Elongated Aperture Defining Multiple Fulcrums"; the U.S. patent application filed on even date herewith, Ser. No. 12/687,052, and entitled "Coated Hole Cutter"; the U.S. patent application filed on even date herewith, Ser. No. 12/687,102, and entitled "Hole Cutter With Extruded Cap"; the U.S. patent application filed on even date herewith, Ser. No. 12/687,078, and entitled "Hole Cutter With Chip Egress Aperture"; the U.S. Design patent application filed on even date herewith, Ser. No. 29/353,762, and entitled "Hole Saw"; and the U.S. Design patent application filed on even date herewith, Ser. No. 29/353,759, and entitled "Hole Saw".

It may be readily understood by those having skill in the pertinent art from the present disclosure that any of numerous changes and modifications may be made to the above-described and other embodiments of the present invention without departing from the scope of the invention as defined in the appended claims. For example, the hole cutters may be made from any of numerous different materials, in any of numerous shapes, taking any of numerous different dimensions. For example the cutting edge may be made from any of numerous different materials or combinations of materials that are currently known or that later become known. As another example, the cutting edge may take any form, pattern, arrangement or configuration that is currently known or that later becomes known, including without limitation tooth patterns that tend to function well in specific applications, hybrid applications or general applications. As an example, the teeth may define a repeating pattern, such as any repeating tooth pattern that is known or that later becomes known, such as a five tooth repeating pattern including high and low teeth and a variable set. Also, the hole cutters may be used in any of numerous different cutting applications, on any of numerous different work piece materials, such as woods, metals, plastics, composites, resins, stones, fabrics, foams, etc. Further, the blade body may not define any elongated apertures or slot, or the apertures or slots may not be contained within the side wall of the cutter. For example, the apertures may extend to the cutting edge, the top rim of the side wall or cap, or may even extend to both the cutting edge and top rim of the side wall or cap to thereby define a channel that extends the entire or substantially entire axial extent of the blade body. For another example, the apertures may include fewer than three fulcrums, or more than three fulcrums. As yet another example, the sloped surface of the inlet portion of the apertures may be curvilinear, rectilinear and/or a combinations of curvilinear and rectilinear edge surface regions. Accordingly, this detailed description of the currently preferred embodiments of the present invention is to be taken in an illustrative, as opposed to a limiting sense.

What is claimed is:

1. A tool, comprising:
   a hole cutter configured for cutting at least one of a wood or metal work piece, including
   a substantially cylindrical blade body defining a wall thickness greater than about 0.032 inch and less than 0.038 inch; and
   a cutting edge formed on one end of the blade body including a plurality of teeth defining an average tooth pitch within a range of about 3.5 TPI to about 5.5 TPI configured for cutting the work piece, which can be wood or metal and forming chips therefrom,
   wherein the substantially cylindrical blade body and the cutting edge define an average tooth pitch to blade body thickness ratio of at least about 110.

2. A tool as defined in claim 1, wherein the substantially cylindrical blade body defines a substantially uniform wall thickness throughout.

3. A tool as defined in claim 1, wherein the blade body has a diameter that is about 3½ inches or less.

4. A tool as defined in claim 1, wherein the cutting edge is bi-metal.

5. A tool as defined in claim 1, further defining an average tooth pitch within a range of about 4 TPI to about 5 TPI, and an average tooth pitch to blade body thickness ratio of at least about 120.

6. A tool as defined in claim 5, further defining an average tooth pitch to blade body thickness ratio within a range of about 130 to about 140.

7. A tool as defined in claim 1, further defining at least one axially-elongated aperture formed through the blade body, wherein the aperture is axially spaced relative to the cutting edge, extends substantially in an axial direction of the blade body, and is configured to receive chips flowing from the cutting edge within an interior of the blade body and at least one of (i) into the aperture, and (ii) through the aperture, to prevent collection of the chips within at least one of the interior of the blade body and an interface between the blade body and the work piece.

8. A tool as defined in claim 7, wherein the axially-elongated aperture defines a minimum width of about 0.27 inch to allow insertion of a number 2 screwdriver therethrough.

9. A tool as defined in claim 7, wherein the axially-elongated aperture defines a slot.

10. A tool as defined in claim 7, wherein the axially-elongated aperture defines a first end adjacent to the cutting edge and axially spaced therefrom a first distance within a range of about 15/100 inch to about 3/8 inch.

11. A tool as defined in claim 10, wherein the cutting edge is defined by a plurality of saw teeth including tips and gullets between the tips, and the first distance is measured from either (i) a deepest gullet of the cutting edge, or (ii) a plane extending between tips of unset teeth of the cutting edge.

12. A tool as defined in claim 10, further defining a plurality of apertures extending through the blade body that are angularly spaced relative to each other.

13. A tool as defined in claim 10, wherein the axially-elongated aperture defines a second end axially spaced further away from the cutting edge than the first end, and the second end is axially spaced from the cutting edge a second distance of at least about 1½ inches.

14. A tool as defined in claim 10, wherein the hole cutter defines a direction of rotation that is a cutting direction of the cutting edge, and the axially-elongated aperture defines a first end axially spaced adjacent to the cutting edge, and a second end axially spaced further away from the cutting edge than the first end and angularly spaced relative to the first end in a direction opposite to the cutting direction.

15. A tool as defined in claim 14, wherein the axially-elongated aperture defines an axially-elongated slot oriented at an acute angle relative to an axis of the blade body.

16. A tool as defined in claim 15, wherein the acute angle is at least about 30°.

17. A tool as defined in claim 16, wherein the acute angle is within a range of about 35° to about 60°.

18. A tool as defined in claim 10, wherein the hole cutter defines a direction of rotation that is a cutting direction of the cutting edge, and an inlet end of the axially-elongated aperture defines an edge surface that slopes away from the cutting edge in a direction opposite the cutting direction.

19. A tool as defined in claim 18, wherein the inlet end defines a maximum width of at least about 4/10 inch, the edge surface is at least about 4/10 inch long, and the edge surface is sloped in at least one of curvilinear and rectilinear manner.

20. A tool as defined in claim 19, wherein the sloped surface is oriented at an acute angle relative to an axis of the blade body within a range of about 35° to about 60°.

21. A tool, comprising:
- a hole cutter configured for cutting at least one of a wood or metal work piece, including
- a substantially cylindrical blade body defining a wall thickness greater than about 0.032 inch and less than 0.038 inch;
- a cutting edge formed on one end of the blade body; and
- at least one means formed within the blade body for receiving chips flowing from the cutting edge within an interior of the blade body and at least one of (i) into said means, and (ii) through said means, and for preventing a collection of the chips within at least one of the interior of the blade body and an interface between the blade body and work piece,
- wherein the cutting edge includes a plurality of teeth defining an average tooth pitch within a range of about 3.5 TPI to about 5.5 TPI that are configured for cutting the work piece, which can be wood or metal and forming the chips therefrom, and the substantially cylindrical blade and cutting edge define an average tooth pitch to blade body thickness ratio of at least about 110.

22. A hole cutter as defined in claim 21, wherein said means is defined by an axially-elongated aperture formed through the blade body, the aperture is axially spaced relative to the cutting edge, extends substantially in an axial direction of the blade body, and is configured to receive the chips flowing from the cutting edge within the interior of the blade body and at least one of (i) into the aperture, and (ii) through the aperture, for preventing the collection of the chips within at least one of the interior of the blade body and an interface between the blade body and the work piece.

23. A hole cutter as defined in claim 22, wherein the axially-elongated aperture defines a first end adjacent to the cutting edge and axially spaced therefrom a first distance within a range of about $15/100$ inch to about $3/8$ inch, and a second end axially spaced further away from the cutting edge than the first end a second distance of at least about $1\frac{1}{2}$ inches.

* * * * *